United States Patent [19]

Kraklio

[11] Patent Number: 4,804,120
[45] Date of Patent: Feb. 14, 1989

[54] BICYCLE CARRIER

[75] Inventor: Kenneth L. Kraklio, Oxford, Iowa

[73] Assignee: K-Rak Products, Inc., Oxford, Iowa

[21] Appl. No.: 98,307

[22] Filed: Sep. 18, 1987

[51] Int. Cl.⁴ ............................................. B60R 9/00
[52] U.S. Cl. ............................................. 224/42.03 B
[58] Field of Search ............ 224/42.03 B, 42.03 R, 224/42.38, 309, 323, 324; 211/5, 23, 24

[56] References Cited

U.S. PATENT DOCUMENTS

| 3,848,784 | 11/1974 | Shimano | 224/323 |
| 3,924,787 | 12/1975 | Gothrup | 224/42.03 B |
| 3,972,456 | 8/1976 | Saffold | 224/42.03 B |
| 4,702,401 | 10/1987 | Graber | 224/42.03 B |

FOREIGN PATENT DOCUMENTS 93243  11/1938  Sweden ............ 224/42.03 B

Primary Examiner—Henry J. Recla
Assistant Examiner—Linda J. Sholl
Attorney, Agent, or Firm—Rudolph L. Lowell

[57] ABSTRACT

A bicycle carrier mounted at the rear end of a vehicle for transporting from one to four bicycles having demountable front wheels. The carrier includes a lower rack rearwardly of the vehicle and an upper rack supported by the lower rack above the rear trunk of the vehicle. Each rack includes an elongated horizontally mounted frame extended transversely of and within the transverse confines of the vehicle. Mounted on each frame associated with each bicycle to be carried thereon is an upwardly facing trough or channel member for receiving and supporting the rear wheel of a bicycle. In linear alignment with the channel member, a fork stanchion is mounted on the frame for supporting the front wheel fork of the bicycle. The front wheel is supported on a wheel stanchion which is mounted on the frame beside the front wheel fork stanchion. A retaining arm assembly on the frame yieldably urges the rear wheel into the channel member when the front wheel fork is locked on the fork stanchion. Bicycles transported on the carrier are positioned in a side-by-side relation and are located within the transverse confines of the vehicle.

11 Claims, 3 Drawing Sheets

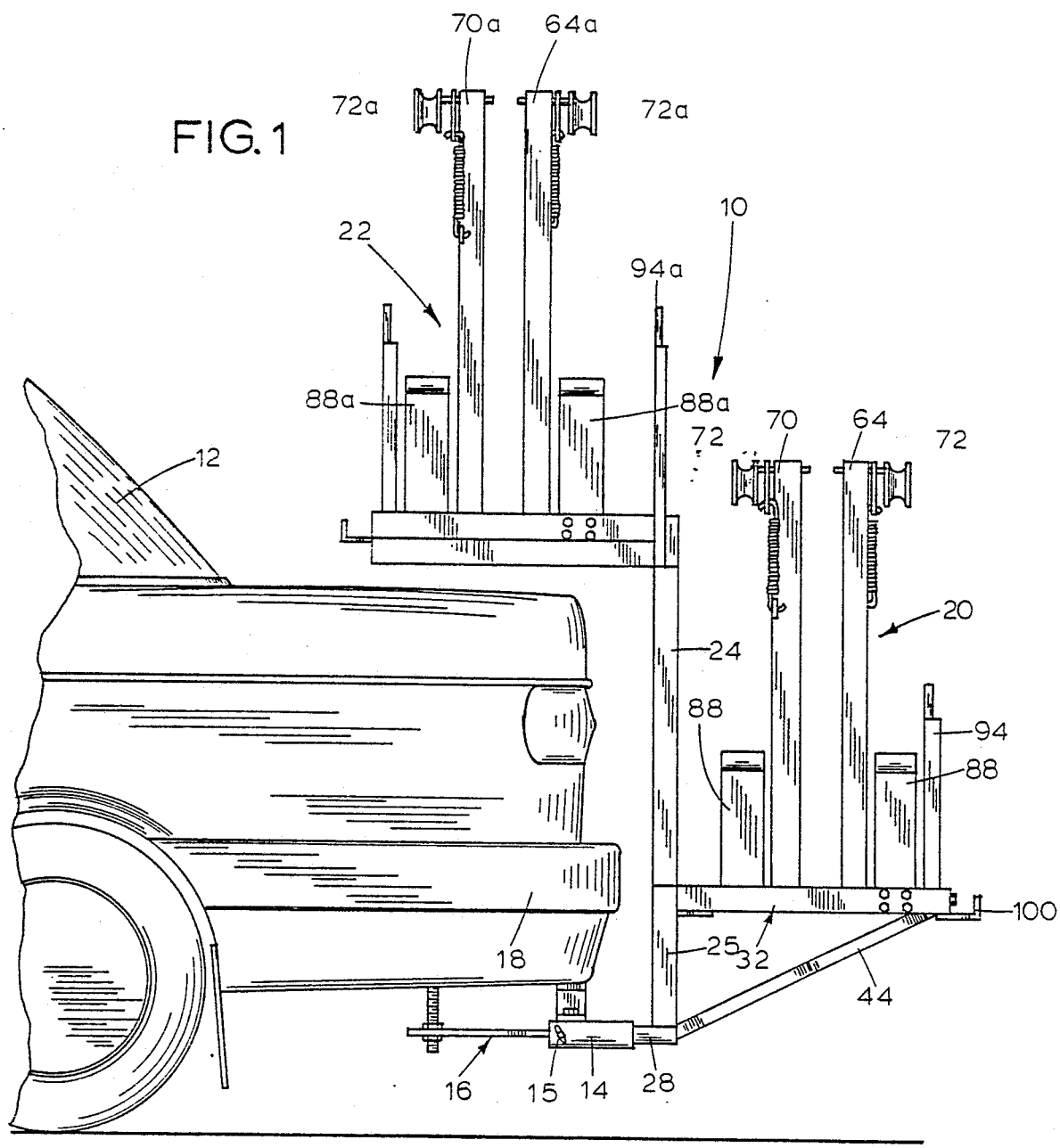

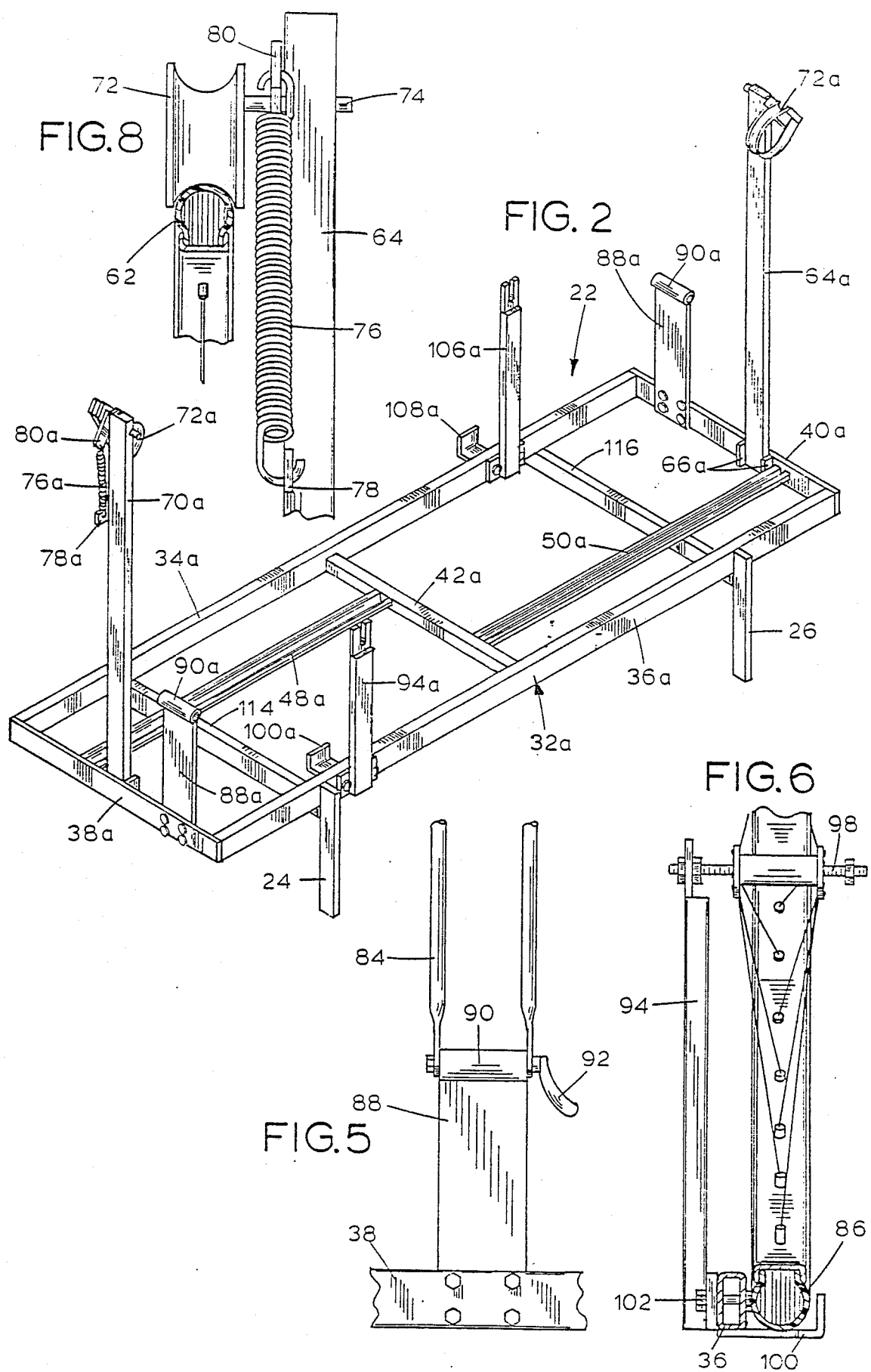

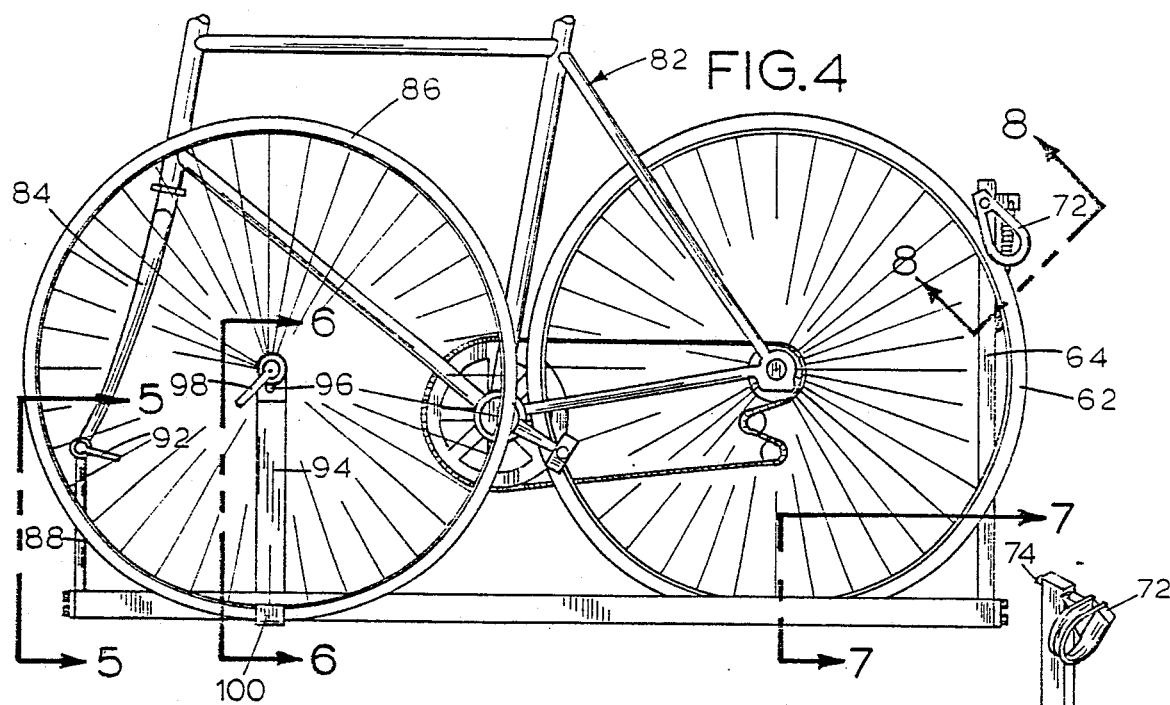
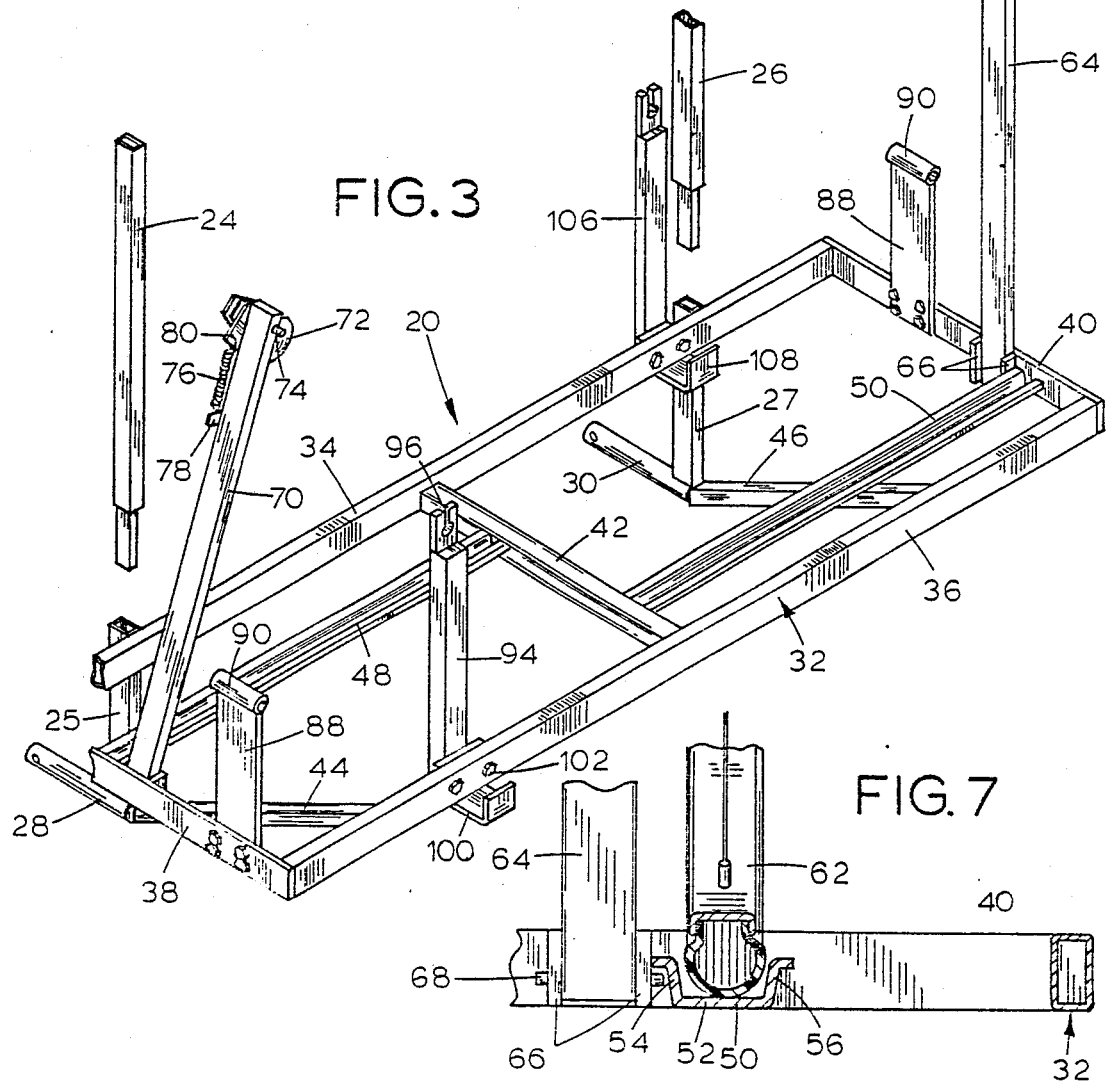

BICYCLE CARRIER

BACKGROUND OF THE INVENTION

The invention relates generally to a carrier for transporting bicycles by a vhielce and more particularly to a bicycle carrier mounted at the rear of the vehicle and supporting the bicycles in an upright position transversely of the vehicle.

Devices for carrying bicycles on vehicles are well known in the art. Most devices, including those described in U.S. Pat. Nos. 4,442,961 and No. 4,524,893 support the bicycles atop of the vehicle in an upright position and oriented longitudinally of the transport vehicles. The bicycles in this position extend substantially above the top of the vehicle and are directly in the slipstream of air created by the moving vehicle thereby adding greatly to the air resistance that must be overcome to move the vehicle at normal driving speeds. The upright bicycles, moreover, must be removed from the carrier if the vehicle is to be driven into a residential garage, commercial parking garage, or other area having a restricted height entrance. Loading and unloading bicycles from such carriers is difficult, requiring that the bicycles be lifted above the top of the vehicle while being balanced upright.

Other prior art devices mount a fully assembled bicycle transversely at the rear of the vehicle. This reduces the air resistance of a transverse bicycle, but results in the outer end portions of the bicycle extending outside the transverse confines of most commercial passenger cars. Care must be taken with carriers of this type to prevent damage to the bicycle or vehicle from objects passing close to the vehicle. These carriers suffer also in that their capacity is typcially limited to one or two bicycles.

SUMMARY OF THE INVENTION

The invention consists of a carrier for bicycles mounted at the rear of a transport vehicle. The carrier includes a horizontal frame extended transversely of the vehicle and detachably supported on the vehicle by a mounting bracket secured to the underside of the rear of the vehicle for convenient removal of the frame from the vehicle.

With the front wheel of the bicycle removed, the rear wheel thereof is positioned in a channel member at one end of the frame, and the front wheel fork is securely supported on a form stanchion at the opposite end of the frame and in linear alignment with the channel. A rear wheel engaging member on the frame yieldably urges the rear wheel downwardly into the channel and toward the fork stanchion. The removed front wheel is securely attached in an upright position on a wheel stanchion and associated wheel rest mounted on the frame to one side of the fork stanchion.

Two corresponding pairs of the channels, wheel and fork stanchions, and wheel engaging members can be combined on one frame to comprise a rack for two bicycles. A second rack may be mounted on the first rack to carry an additional pair of bicycles to provide for the transport of four bicycles with a single vehicle.

BRIEF DESCRIPTION OF THE DRAWINGS

FIG. 1 is a side elevational view of a carrier of the present invention showing two racks thereof in assembly relation with the rear end portion of a transport vehicle;

FIG. 2 is a perspective view of the upper rack of the bicycle carrier;

FIG. 3 is a perspective view of the lower rack of the bicycle carrier with a portion removed for clarity;

FIG. 4 is a side elevational view of a bicycle mounted on one of the racks for transport;

FIG. 5 is an enlarged sectional detail view taken along the line 5—5 of FIG. 4;

FIG. 6 is an enlarged sectional detail view as seen on line 6—6 of FIG. 4;

FIG. 7 is an enlarged sectional detail view taken along the line 7—7 of FIG. 4; and FIG. 8 is an enlarged sectional detail view as seen in line 8—8 of FIG. 4

DETAILED DESCRIPTION OF A PREFERRED EMBODIMENT

Illustrated in FIG. 1, generally at 10, is a bicycle carrier of the present invention shown mounted at the rear end of a transport vehicle 12. A mounting bracket 16 for the carrier 10 supported on the underside of the vehicle 12 includes a pair of transversely spaced mounting tubes, one of which is illustrated at 14, that are located generally below the rear bumper 18.

The bicycle carrier 10 consists of a pair of bicycle racks 20 and 22 to be hereinafter referred to as lower rack and upper rack, respectively, each of which is adapted to carry a pair of bicycles in upright side-by-side positions extended transversely of and within the transverse confines of the vehicle 12. Since two bicycles may be similarly carried on each of the pair of racks, only the lower rack 20 will be described in detail, with the corresponding elements of the upper rack 22 being indicated by like numerals.

The lower rack 20 (FIGS. 1 and 3) has an elongated frame 32 positionable transversely and horizontally of the vehicle that includes a front longitudinal frame member 34 and a rear longitudinal frame member 36 which are interconnected by end member 38 and 40 and a central cross member 42. A pair of longitudinally spaced upright tubular posts 25 and 27 are detachably secured to the frame member 34. Transverse braces 44 and 46 corresponding to the post members 25 and 27, respectively, extend from the lower end portions of the support posts 25 and 27 to the rear frame member 36. The lower rack 20 is supported on the vehicle 12 by a pair of support rods 28 and 30 secured to and projected horizontally forwardly of the lower end portion of the support posts 25 and 27 for reception within the mounting tubes 14 of the bracket 16.

For receiving the rear wheel of a first bicycle there is welded between end member 38 and central member 42, at a position adjacent the front frame member 34, an upwardly facing trough or channel 48. In a similar manner, a second trough or channel 50 is secured between cross member 42 and end member 40, at a position adjacent rear frame member 36. As best illustrated in FIG. 7, for the channel member 50 each channel member includes a horizontal bottom web portion 52 and diverging leg portions 54 and 56. The channels 48 and 50 are of a size to accommodate and retain a rear bicycle wheel and tire, illustrated in FIG. 7 at 62.

Mounted on the end member 40 of the rack frame 32 and adjacent to the channel member 50 is a first rear wheel retaining arm 64 corresponding to the rear wheel of a first bicycle. The lower end portion of the retaining arm 64 is received between a pair of ears 66 on the end member 40 that extend inwardly of the rack frame 32. The retaining arm 64 is pivoted ona rod 68 extended between and supported in the ears 66 and the lower end portion of the retaining arm 64 (FIG. 7) for pivotal movement from a horizontal, folded position to a rigid upright or operative position. A second rear wheel retaining arm 70 for a second bicycle, corresponding in structure to the first retaining arm 64, is shown in FIG. 3 in a pivotally moved position.

Connected at the upper end of each of the retaining arms 64 and 70 is a biasing hoop 72 of a generally horse collar shape in side elevation that is pivotally mounted on a pivot pin 74 (FIG. 8) for pivotal movement in a vertical plane above the corresponding trough or channel. The hoop 72 is formed from an elongated member of a U-shape in transverse cross section which is bent into the arcuate horse collar shape to provide a concave outer peripheral surface of a width to receive a portion of a bicycle tire or near wheel 62, as illustrated in FIG. 8. A coil spring 76 (Fig. 3) is arranged in tension between an ear 78 located on the retaining arm below the hoop 72 and a pivot arm 80 which is secured to and extends radially from the pivot pin 74. The coil spring 76 coacts with the configuration of the hoop 72 to continuously and yieldably urge the biasing hoop 72 downwardly against the rear tire and wheel 62 of a bicycle 82 carried on the rack, as illustrated in FIG. 4, to retain the rear wheel 62 in the channel 48.

Before mounting the bicycle, indicated at 82 in FIG. 4, on the rack 20, a front wheel and tire 86 of the bicycle is removed from its associated front fork 84. With the bicycle positioned on the lower rack 20 with the rear wheel 62 in the channel member 50, the front fork 84, as best seen in FIG. 5, is supported on a fork stanchion 88 that is bolted to the end member 38 to the rack frame 32 in linear alignment with the trough or channel 50. THe upper end portion of the fork stanchion 88 carries a hub 90 of a size to be received between the terminal portions of the front fork 84 which is formed with conventional slots (not shown). A commercially available quick relese lever 92 is inserted through the aligned slots and hub member 90 to secure and lock the front fork 84 to the fork stanchion 88. (FIG. 5).

It is seen, therefore, that with the front fork 84 locked on the stanchion 88 and the rear wheel 82 biased downwardly and toward the front fork stanchion 88, the bicycle is positively held against lateral and longitudinal movements relative to the rack frame 32.

For carrying the removed front wheel 86 of the bicycle 82, a front wheel stanchion 94 is bolted to the rear frame member 36 intermediate the end member 38 and the central cross bar 42. (FIGS. 3 and 6). The upper end portion of the wheel stanchion 94 is bifurcated to form a slot 96 for receiving one end of a conventional quick release lever 98 to lock the front wheel 86 on the wheel stanchion 94, as best shown in FIG. 6. A U-shaped wheel rest 100 for the front wheel has one leg welded to the lower end portion of the wheel stanchion 94 and is secured to the frame member 36 by bolts 102. A wheel stanchion 106 and wheel rest 108 corresponding to the trough member 48 are bolted to the forward frame member 34 intermediate the central brace 42 and the end member 40, and are similar in construction and position to the wheel stanchion 94 and wheel rest 100.

The lower rack 20 thus efficiently supports a pair of bicycles longitudinally of the frame in a side-by-side relation, with the removed front wheels supported in upright positions opposite the front fork of the bicycles within the vertical and transverse confines of the carrying vehicle. If it is desired to carry 3 or 4 bicycles, the upper rack 22 is attached to and supported by the lower rack 20 to carry an additional pair of bicycles above the trunk of the vehicle. The upper rack 22, illustrated in FIGS. 1 and 2, is supported on the vertical support posts 25 and 27 of the lower rack 20 by means of a pair of associated posts, 24 and 26, respectively, having lower end portions slidably received within the tubular support posts 25 and 27, respectively. The upper rack 22 is thus firmly supported forwardly of the lower rack 20 with the rack frame 32a positioned longitudinally of and above the trunk area of the transport vehicle 12. The elongated frame 32a of the upper rack 22 and its assembly with the bicycle supporting elements are similar in construction and use to the like parts of the lower rack 20. Similar numerals with a suffix "a", therefore, are used to describe like parts. In this respect, it is to be noted that horizontal cross bars 114 and 116 serve to brace the elongated frame 32a of the upper rack in lieu of the braces 44 and 46 of the lower rack 20.

To use the carrier 10, the mounting bracket 16 is initially attached to the underside of and at the rear of the vehicle 12. Since the mounting tubes 14 are positioned below the vehicle rear bumper and generally underneath such bumper, the mounting bracket 16 may safely remain on the vehicle even upon removal of the carrier 10.

The lower rack 20 is attached to the vehicle by insertion of the support rods 28 and 30 into the mounting tubes 14 and a retaining means, such as a cotter key 15 or lock pin (FIG. 1), is used to prevent accidental retraction of the support rods from the mounting tubes.

If one or two bicycles are to be transported, only the lower rack 20 need be used. In transporting 3 or 4 bicycles, the upper rack 22 would also be used. In this event, the bicycles to be carried on the uppe rack 22 would be initially mounted for convenience prior to the mounting of the bicycles in the lower rack.

It is understood that the foregoing description of the preferred embodiment may be modified or changed by one skilled in the art without departing from the spirit and scope of the invention as defined in the following claims:

I claim:

1. A carrier mountable at the rear end of a vehicle for transporting a first bicycle having a rear wheel, a front wheel fork, and a front wheel detachably mounted on said fork, comprising:
    (a) an elongated frame;
    (b) means for mounting said frame on the vehicle extended transversely thereof in a substantially horizontal plane;
    (c) said frame having channel means adjacent one end thereof and extended longitudinally thereof for receiving and supporting the rear wheel;
    (d) a fork stanchion adjacent the other end of said frame for supporting said front wheel fork in a fixed position; and
    (e) means on said frame yieldably engageable with an upper rear portion of the rear wheel for urging the bicycle toward said fork stanchion to retain the rear wheel in said rear wheel supporting means.

2. A carrier mountable at the rear end of a vehicle and extended transversely thereof for transporting a bicycle having a rear wheel, a front wheel fork, and a front wheel detachably mounted on said fork, comprising:

(a) an elongated frame at a length less than one transverse dimension of the vehicle including:
  (i) a fork stanchion adjacent one end of said frame for supporting the front wheel fork;
  (ii) a longitudinally extended and upwardly facing channel shped member adjacent the other end of said frame for receiving and supporting the rear wheel within the transverse confines of said vehicle, when the front wheel fork is supported in the fork stanchion;
  (iii) a wheel stanchion to one side of said fork stanchion for supporting the detached front wheel within the transverse confines of said vehicle; and
  (iv) means engageable with the rear wheel for retaining the rear wheel in said channel member.

3. The carrier as defined in claim 1, including: (a) a front wheel stanchion on said frame for supporting the detached front wheel.

4. The carrier as defined in claim 1, wherein (a) said fork stanchion is aligned with said channel means longitudinally of said frame to support the bicycle transversely of and within the transverse confines of the vehicle.

5. The carrier as defined in claim 1, wherein: (a) said fork stanchion includes releasable locking means for securing the front wheel fork to said fork stanchion.

6. The carrier as defined in claim 3, including: (a) releasable locking means for securing the front wheel to said wheel stanchion.

7. The carrier as defined in claim 3, wherein: (a) said wheel stanchion includes a front wheel rest at the lower end portion thereof.

8. The carrier as defined in claim 1, wherein said retaining means includes:
  (a) a vertical post mounted on said frame at the one end of said channel member adjacent said one end of said frame;
  (b) an arcuate rear wheel engaging member pivotally supported on the upper end portion of said post having a concavely formed outer peripheral surface for receiving a portion of the outer peripheral surface of the rear wheel; and
  (c) means on said post for yieldably urging said wheel engaging member into engagement with the rear wheel.

9. The carrier as defined in claim 1, further comprising:
  (a) means on said frame for supporting a second bicycle, including a channel means for receiving a rear wheel, a front wheel fork stanchion, and a front wheel stanchion for carrying the second bicycle transversely of the vehicle in a side-by-side relation with the first bicycle.

10. A carrier mountable on a vehicle having a rear trunk for transporting from one to four bicycles having detachable front wheels, comprising:
  (a) a lower rack including an elongated frame of a length to extend within the transverse confines of the vehicle for transporting one or two bicycles;
  (b) means for mounting said lower rack in a substantially horizontal plane transversely of and rearwardly of the vehicle;
  (c) an upper rack including an elongated frame of a length to extend within the transverse confines of the vehicle for transporting one or two bicycles;
  (d) means supporting said upper rack on said lower rack in a substantially horizontal position extended transversely of the vehicle and above the trunk; and
  (e) means supporting the bicycles, with the front wheels thereof detached, on said upper rack and said lower rack within the longitudinal confines of their associated frames.

11. The carrier as defined in claim 10, wherein:
  (a) the two bicycles transported on each of said upper and lower racks are positioned in a side-by-side relation within the transverse confines of an associated frame.

* * * * *